(12) United States Patent
Wang

(10) Patent No.: US 7,459,208 B2
(45) Date of Patent: Dec. 2, 2008

(54) FOAM GLASS PRODUCT

(75) Inventor: Bo Wang, Lompoc, CA (US)

(73) Assignee: Advanced Minerals Corporation, Goleta, CA (US)

( * ) Notice: Subject to any disclaimer, the term of this patent is extended or adjusted under 35 U.S.C. 154(b) by 151 days.

(21) Appl. No.: 10/487,305

(22) PCT Filed: Aug. 20, 2001

(86) PCT No.: PCT/US01/25970

§ 371 (c)(1),
(2), (4) Date: Sep. 27, 2004

(87) PCT Pub. No.: WO03/016232

PCT Pub. Date: Feb. 27, 2003

(65) Prior Publication Data

US 2005/0031844 A1 Feb. 10, 2005

(51) Int. Cl.
*C03C 11/00* (2006.01)

(52) U.S. Cl. ............. 428/312.6; 428/314.4; 428/921; 501/39; 106/15.05; 106/18.12; 106/DIG. 2; 252/62; 252/601; 252/602; 252/604

(58) Field of Classification Search ............. 428/304.4, 428/312.6, 314.4, 921; 501/39; 106/15.05, 106/18.12, DIG. 2; 181/293; 252/62, 601, 252/602, 604, 605; 65/22; 264/41, 42, 43, 264/44, 45.3, 51
See application file for complete search history.

(56) References Cited

U.S. PATENT DOCUMENTS

| | | | |
|---|---|---|---|
| 3,150,988 A | | 9/1964 | Dess et al. |
| 3,459,565 A | | 8/1969 | Jones et al. |
| 3,793,039 A | | 2/1974 | Rostoker |
| 3,874,861 A | | 4/1975 | Kurz |
| 3,951,632 A | | 4/1976 | Seki et al. |
| 3,986,883 A | * | 10/1976 | Toth et al. ............ 501/39 |
| 4,198,224 A | | 4/1980 | Kirkpatrick |
| 4,207,113 A | * | 6/1980 | Yoshino et al. ........ 501/84 |
| 4,248,810 A | * | 2/1981 | Erskine ............ 264/43 |
| 4,430,108 A | | 2/1984 | Hojaji et al. |
| 4,758,538 A | | 7/1988 | Satoh et al. |
| 4,990,398 A | | 2/1991 | Fukumoto et al. |
| 5,069,960 A | | 12/1991 | Fukumoto et al. |
| 5,516,351 A | * | 5/1996 | Solomon et al. ............ 65/17.4 |
| 6,368,527 B1 | * | 4/2002 | Gontmakher et al. ......... 264/42 |
| 6,478,993 B2 | * | 11/2002 | Gontmakher et al. ......... 264/42 |
| 6,964,809 B2 | | 11/2005 | Hojaji et al. |
| 7,354,542 B1 | * | 4/2008 | Girgin ............ 264/122 |
| 2004/0162210 A1 | | 8/2004 | Dejaiffe |
| 2005/0016093 A1 | | 1/2005 | Buarque De Macedo |
| 2005/0019542 A1 | | 1/2005 | Hojaji et al. |

FOREIGN PATENT DOCUMENTS

| | | | |
|---|---|---|---|
| CN | 1 076 671 | | 9/1993 |
| JP | 53125442 A | * | 11/1978 |
| JP | 54008614 A | * | 1/1979 |
| JP | 58088128 A | * | 5/1983 |
| JP | 58099128 A | * | 6/1983 |
| JP | 01056333 A | * | 3/1989 |
| JP | 02059482 A | * | 2/1990 |

OTHER PUBLICATIONS

English Language Derwent Abstract of CN 1 030 565.
English Language translation of CN 1 076 671.
English Language Derwent Abstract of JP 61-55128.
English Language Derwent Abstract of JP 63-144144.
English Language Derwent Abstract of JP 64-52626.
English Language abstract of JP 02-092842.
English Language Derwent Abstract of JP 2001-294436.

* cited by examiner

*Primary Examiner*—John J. Zimmerman
*Assistant Examiner*—Aaron Austin
(74) *Attorney, Agent, or Firm*—Finnegan, Henderson, Farabow, Garrett, and Dunner, L.L.P.

(57) ABSTRACT

Improved foam glass products prepared from natural glasses, such as unexpanded fine perlite ore and expanded fine perlite, methods of producing the improved foam glass products, and methods of use thereof are provided. The improved foam glass product made from natural glasses has, for example, a thermal conductivity less than 0.70 Btu·in/hr·F·ft$^2$ (0.101 W/m° K) at 73° F.(296° K), a compressive strength greater than 100 PSI (689 kPa) and a density less than 20 lb/ft$^3$ (320 kg/m$^3$). The improved foam glass product made from natural glasses may be used in a variety of applications including thermal and acoustic insulation applications.

24 Claims, No Drawings

FOAM GLASS PRODUCT

CROSS-REFERENCE TO RELATED APPLICATIONS

This is a national phase filing under 35 U.S.C. §371 of International Application No. PCT/US01/25970, filed on Aug. 20, 2001.

TECHNICAL FIELD

This invention relates to improved foam glass products prepared from glass, particularly from natural glasses, such as unexpanded fine perlite ore and expanded fine perlite, which are useful, for example, in thermal insulation and acoustic insulation applications.

BACKGROUND ART

Throughout this application, various publications, patents, and published patent applications are referred to by an identifying citation; full citations for these documents may be found at the end of the specification. The disclosure of the publications, patents, and published patent specifications referred in this application are hereby incorporated by reference into the present disclosure.

Glass is an inorganic product of fusion that has cooled to a rigid condition without crystallizing (ASTM C-162). The most common glasses are silicate glasses. The basic structural unit of silicate glasses is the silicon-oxygen tetrahedron in which a silicon atom is tetrahedrally coordinated to four surrounding oxygen atoms. Similar to the crystalline silicates, the $SiO_4$ tetrahedra in the silicate glasses are found in a variety of configurations depending on the oxygen-to-silicon ratio in the glass compositions.

Some glasses are naturally occurring, such as perlite, pumice, obsidian, pitchstone, and volcanic ash. Others, such as soda-lime glasses, are produced synthetically. For example, soda-lime glass may be made by melting batches of raw materials containing the oxides of silicon (i.e., $SiO_2$), aluminum (i.e., $Al_2O_3$), calcium (i.e., CaO), sodium (i.e., $Na_2O$), and sometimes potassium (i.e., $K_2O$), or lithium (i.e., $Li_2O$) together in a furnace, and then allowing the melt to cool so as to produce the amorphous product. Glasses may be made in a wide variety of shapes, including sheets or plates, cast shapes, or fibers. Methods of manufacturing the principal families of glasses have been reported (Scholes, 1974). Mineral wools, rock wools, and silicate cottons are generic names for manufactured fibers in which the fiber-forming substances may be slag, certain rocks, or glass (Kujawa, 1983).

Foam glasses are a special class of lightweight glass materials having numerous completely sealed small cells. The process of making foam glasses has been developed over many years and the most common technique of making foam glasses consists of following steps: 1) melting of glass raw material at high temperature to form a base glass, 2) grinding the base glass with additional foaming agents, 3) foaming of the ground glass powder at high temperature. The base glass composition is similar to the regular window glass which typically contains 70-73% $SiO_2$, 1-3% $Al_2O_3$, 0.1-0.5% $Fe_2O_3$, 13-15% $Na_2O$, 0-2% $K_2O$, 5-7% CaO and 3-5% MgO (by weight). The foaming agents are normally carbon black and alkali carbonates.

Other techniques have also been used to make foam glasses. For example, by leaching out the borate phase from a borosilicate glass, a silica-rich phase with very fine pores (10 to 25 Å) is obtained (Elmer, 1971). The moisture trapped in the fine pores by leach solution causes the fine pores to expand after heating the leached glass at 1300-1425° C. by flash-firing. The foaming and sintering of the porous glass particles occurs simultaneously. Due to the residual moisture left in the glass body which increases thermal conductivity, the final foam glass product thus prepared has less desirable insulating property. Alternately, foam glasses can also be made by blowing air or other gases into molten glass and allowing the molten glass to cool and entrap the bubbles or cells in the solidified glass.

The starting materials for commercially manufactured foam glasses are typically virgin glasses. To reduce the cost, various low cost amorphous materials have been used. Recycled mixed color cullet glass has been used to make foam glasses (Solomon, 1996). The waste glass is washed and passed through a magnetic separation step before being passed to a hammer mill or similar type crusher where the separated glass is crushed to a desired particle size. The crushed glass particles and a foaming agent such as $CaCO_3$ or $CaSO_4$ are sized and mixed. The mixtures are placed in molds and passed through a furnace where the mixture is heated to and maintained at a foaming temperature and then cooled or annealed to produce foamed glass blocks.

Minerals have also been used as the starting materials for the foam glass products. For example, diatomaceous earth (natural, calcined and flux calcined), fly ash or their mixture were used to make foam glass (Hojaji, 1984). Skin-surfaced foam glass heat-insulating tiles have been made from vitrifiable minerals such as liparite, rhyolite, pearlite, obsidian and volcanic ash (Fukumoto, 1991).

Conventional perlite products are normally produced by binding expanded perlite particles or a mixture of expanded perlite particles, gypsum, cement and reinforcing fibers with organic or inorganic binders (Alhamad, 1990, Shepherd, 1993, Sun, 2000). The conventional perlite products possess less compressive strength and dimensional stability than is desirable. The conventional expanded perlite products also disadvantageously absorb moisture and do not have optimal water-resistance properties.

SUMMARY OF THE INVENTION

Improved foam glass products are provided that advantageously have low thermal conductivity, high compressive strength, and low density. The foam glass products may be used in a variety of applications including thermal and acoustic insulation applications. The improved foam glass products are in one embodiment made from natural glasses, such as fine perlite ore and expanded fine perlite. Also provided are methods of producing the improved foam glass products, and applications of use of these products.

The foam glass product can be formed as a lightweight glass material having numerous completely sealed small cells. Since each small cell is virtually an insulating space, the closed-cell structure provides superior thermal and acoustic insulating properties which can be used as insulating materials for building and chemical industries. In addition to their superior insulation properties, the foam glasses also have rigid and stable glass structures with superior compressive strength and are fire-resistant, chemical resistant, non-corrosive, water and vapor resistant, vermin and microbe resistant. For comparison, other well-known insulating materials such as glass fiber, polystyrene and polyurethane lack structural strength and are not suitable for high temperature applications. Some (polystyrene and polyurethane) even generate toxic fumes in the fire. Foam glasses can also be made into various shapes and configurations depending on the applications.

In one embodiment, the improved foam glass product has a thermal conductivity less than 0.70 Btu·in/hr·F·ft$^2$ (0.101 W/m.° K) at 73° F. (296° K), a compressive strength greater than 100 PSI (689 kPa) and a density less than 20 lb/ft$^3$ (320 kg/m$^3$).

In one embodiment the improved foam glass product ohas a thermal conductivity less than 0.60 Btu·in/hr·F·ft$^2$ (0.087 W/m.° K) at 73° F. (296° K); or a thermal conductivity less than 0.50 Btu·in/hr·F·ft$^2$ (0.072 W/m.° K) at 73° F. (296° K).

In another embodiment, the improved foam glass product has a compressive strength greater than 200 PSI (1379 kPa); a compressive strength greater than 300 PSI (2068 kPa); a compressive strength greater than 400 PSI (2758 kPa); a compressive strength greater than 500 PSI (3447 kPa); or a compressive strength greater than 600 PSI (4137 kPa).

In a further embodiment, the improved foam glass product has a density less than 15 lb/ft$^3$ (240 kg/m$^3$); or a density less than 10 lb/ft$^3$ (160 kg/m$^3$).

The improved foam glass product may be derived from glass, such as natural glass, for example, unexpanded perlite and/or expanded perlite.

In another embodiment, a process for the preparation of an improved foam glass product is provided, the method comprising melting a glass with at least one foaming agent to form the improved foam glass product. The glass may be natural glass, such as unexpanded perlite and/or expanded perlite. Optionally, boron is used as a glass network former in the melted glass.

In a further embodiment, a process for the preparation of an improved foam glass product is provided, the method comprising melting a glass and bubbling a gas through the glass to form the improved foam glass product. The glass may be, for example, natural glass, such as unexpanded perlite and/or expanded perlite.

A thermal insulating material comprising a foam glass product made by the processes disclosed herein is provided.

A thermal insulating material comprising a foam glass product as disclosed herein is provided. Other materials that are provided that comprise a foam glass product as disclosed herein include an acoustic insulating material, a lightweight rigid structural material, a lightweight chemical resistant material, and a lightweight non-combustible material.

Also provided are compositions comprising an improved foam glass product as disclosed herein and a structural or reinforcing material. The structural or reinforcing material may comprise, for example, carbon fiber, glass fiber, metal fiber, ceramic fiber, woven fiber, metal honeycomb, ceramic honeycomb, fibrous minerals, and/or wollastonite.

Further provided are compositions comprising the foam glass products disclosed herein, wherein the foam glass product comprises a glaze or coating.

MODES FOR CARRYING OUT THE INVENTION

Improved foam glass products are provided that advantageously have low thermal conductivity, high compressive strength, and low density. The foam glass products may be used in a variety of applications including thermal and acoustic insulation applications. The improved foam glass products are in one embodiment made from natural glasses, such as fine perlite ore and expanded fine perlite. Also provided are methods of producing the improved foam glass products, and applications of use of these products.

Additional glass network formers, such as boron, and additional glass network modifiers, such as sodium and calcium, may be used in the process of making the foam glass products. Foaming agents, such as sodium carbonate, calcium carbonate and carbon black, may be used in the process of making the foam glass products.

The improved foam glass products of present invention have low density which indicates greater void volume in the structure, and this leads to better insulation efficiency. A closed-cell continuous rigid glass structure can provide the improved foam glass product of present invention with greater compressive strength, greater dimensional stability and improved water-resistance, which provides constant thermal insulation efficiency, compared to conventional perlite thermal insulating products.

The foam glass products may be made from natural glasses such as unexpanded fine perlite ore and expanded fine perlite. In one embodiment, there is provided an improved foam glass product made, for example, from natural glasses, having a low thermal conductivity (for example, less than 0.50 Btu·in/hr·F·ft$^2$).

In a further embodiment, the improved foam glass product, for example, made from natural glasses, is characterized by high compressive strength (for example, higher than 600 PSI) and low density (for example, less than 10 lb/ft$^3$). The improved foam glass product made, for example, from natural glasses advantageously has low thermal conductivity, while also having high compressive strength and low density, thereby permitting much greater utility in thermal insulation applications.

The foam glass product in one embodiment is made from natural glasses, such as fine perlite ore or expanded fine perlite. The term "natural glass" is used herein the conventional sense and refers to natural glasses, commonly referred to as volcanic glasses, which are formed by the rapid cooling of siliceous magma or lava. Most natural glasses are chemically equivalent to rhyolite. Natural glasses which are chemically equivalent to trachyte, dacite, andesite, latite, and basalt are known but are less common. The term "obsidian" is generally applied to dark, most often black, massive natural glasses that are rich in silica (i.e., $SiO_2$). Obsidian glasses may be classified into subcategories according to their silica content, with rhyolitic obsidians (containing typically about 73% $SiO_2$ by weight) as the most common (Berry et al., 1983).

Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite ore is distinguished from other natural glasses by a higher content (2-10% by weight) of chemically bonded water, the presence of a vitreous, pearly luster, and characteristic concentric or arcuate onion skin-like (i.e., perlitic) fractures.

Perlite ore can be processed and expanded at high temperature to make expanded perlite products. The processing of perlite can include comminution of the ore (crushing and grinding), screening, thermal expansion, milling, and air size separation of the expanded material to meet the specification of the finished product and other methods known in the art. For example, perlite ore is crushed, ground, and separated to a predetermined particle size range (e.g., passing 30 mesh), then the separated material is heated in air at a temperature of 870-1100° C. in an expansion furnace (cf. Neuschotz, 1947; Zoradi, 1952), where the simultaneous softening of the glass and vaporization of contained water leads to rapid expansion of glass particles to form a frothy glass material with a bulk volume up to 20 times that of the unexpanded ore. The expanded perlite is then separated to meet the size specification of the final product.

Expanded perlite includes one or more cells, or parts of cells, in which a cell is essentially a void space partially or entirely surrounded by walls of glass, usually formed from expansion of gases when the glass is in a softened state. The presence of gas-filled or vacuous cells in a given volume of glass results in lower centrifuged wet density than for the same volume of solid glass. If cells are closed and air is entrapped, the particles of perlite may float on liquid. Fracturing of perlite, for example, by milling, can create an intricate cellular structure that retains the characteristic of low wet density and also provides useful features for filtration and functional filler applications.

Using methods disclosed herein, commercially available glasses such as unexpanded fine perlite ore and expanded fine perlite or other natural glasses may be used to produce the foam glass product of present invention. The products so made are superior in many applications to existing products, and the production process is economically attractive because of the relatively low cost of the feed.

In one embodiment, an improved foam glass product made, for example, from natural glasses, is provided with a thermal conductivity less than 0.60 Btu·in/hr·F·ft$^2$. In another embodiment, the thermal conductivity is less than 0.50 Btu·in/hr·F·ft$^2$, for example, less than 0.48 Btu·in/hr·F·ft$^2$.

In another embodiment, the improved foam glass product made, for example, from natural glasses, is further characterized by having a compressive strength greater than 100 PSI; greater than 200 PSI, greater than 300 PSI; greater than 400 PSI; greater than 500 PSI; or in one preferred embodiment, greater than 600 PSI.

In another embodiment, the improved foam glass product made, for example, from natural glasses, has a density not greater than 20 lb/ft$^3$; not greater than 15 lb/ft$^3$; or in one preferred embodiment, not greater than 10 lb/ft$^3$.

Another aspect of the present invention comprises a method of preparing the improved foam glass product using unexpanded fine perlite ore.

Still another aspect of the present invention comprises a method of preparing the improved foam glass product using expanded fine perlite.

Still another aspect of the present invention comprises a method of preparing the improved foam glass product using other natural glasses.

Still another aspect of the present invention comprises a method of preparing the improved foam glass product from glasses such as natural glasses using sodium carbonate and calcium carbonate as glass network modifier and as foaming agents at the same time.

Still another aspect of the present invention comprises a method of preparing the improved foam glass product from glasses such as natural glasses using carbon black as foaming agent.

Still another aspect of the present invention comprises a method of preparing the improved foam glass product from glasses such as natural glasses using boric acid as the glass network former.

Still another aspect of the present invention comprises a composition incorporating structural reinforcing materials such as carbon fiber, glass fiber, metal fiber, ceramic fiber, woven fiber, metal honeycomb, ceramic honeycomb, certain minerals (e.g., wollastonite), etc., into the improved foam glass product.

Still another aspect of the present invention comprises a composition incorporating a glaze or coating over the improved foam glass product of present invention.

A. Methods for Preparing the Improved Foam Glass Product from Natural Glasses

The foam glass products may be made from any of a variety of glass materials available in the art. By way of example, methods of preparing foam glass products from natural glasses is described.

The improved foam glass products made, for example, from natural glasses, have a low thermal conductivity, high compressive strength and low density. The improved foam glass products made, for example, from natural glasses, can be prepared by several methods.

The improved foam glass products of present invention may be made by melting a glass material with a glass network former, a glass network modifier and/or foam agents, resulting in the desired improved foam glass product.

One preferred method of preparing the improved foam glass products of present invention is by melting perlite feed material with a glass network former, glass network modifier and/or foam agents, resulting in the desired perlite improved foam glass product.

The perlite feed material may be commercially available fine perlite ore or expanded fine perlite, such as Harborlite® MB grade (unexpanded fine perlite ore) or Harborlite® 200 grade (expanded fine perlite).

The glass network formers are the cations forming the triangle and tetrahedra oxygen polyhedra to build the glass network. Typical glass network formers are Si, B, P and Ge. The glass network modifiers are the cations occupying random positions to provide additional oxygen to modify the glass network. Typical glass network modifiers are alkali and alkaline earth metals such as Li, Na, K, Mg and Ca.

The foaming agents are the materials releasing gas or vapor at the foaming temperature during the glass melting to form the sealed cell structure. Typical foaming agents are alkali and alkali earth carbonates, alkali and alkali earth sulfates and carbon black.

The perlite feed material optionally is mixed with appropriate amounts of soda ash, calcium carbonate, and carbon black or in some cases with boric acid. Examples of typical compositions include: soda ash from 3 percent to 9 percent, calcium carbonate from 5 percent to 10 percent, carbon black from 0.3 percent to 1.0 percent, and boric acid from 2 percent to 7 percent. After fine milling in a steel mill or a ball mill, the mixture is placed in a heat resistant metal or alloy container such as nickel crucibles or stainless steel molds coated with high melting powders preferable aluminum oxide as the releasing agent. The foam glass is optionally formed by melting the mixture between 2000° F. to 2100° F. for 30 minutes to 1 hour in an electrical furnace and then annealed in a separate furnace. The annealing process is achieved by furnace cooling the sample between 1200° F. and 1300° F. to room temperature.

The improved foam glass products can also be prepared from glasses, such as natural glasses, by gas bubbling the aluminum silicate glass melt made from unexpanded fine perlite ore and expanded fine perlite or other glasses, such as natural glasses. This process is carried out at high temperature due to the high melting point of the glass such as aluminum silicate glass. An annealing process is then preferred after glass forming process. The annealing process can include a slow reduction in the temperature to reduce crystallization or stress in the improved foam glass, thus improving its strength.

B. Methods for Characterizing the Improved Foam Glass Product Made from Natural Glasses 1. Thermal Conductivity The thermal conductivity indicates the effectiveness of a material as a thermal insulator. For use in thermal insulation, foam glasses with lower thermal conductivity values produce the most effective insulation.

The thermal conductivity of the improved foam glass product made, for example, from natural glasses, may be measured based on a standard method of the American Society of Testing and Materials (ASTM E-1530). In a preferred method, a 0.25-inch thick by 2 inch in diameter specimen and a heat transducer (HFT) are sandwiched between two flat plates controlled at different temperatures to produce a heat flux through the test stack. A reproducible load is applied to the test stack by pneumatic or hydraulic means to ensure that there is a reproducible contact resistance between the specimen and plate surfaces. A guard ring surrounds the test stack and is maintained at a uniform mean temperature of the two plates in order to minimize lateral heat flow to and from the stack. At steady state, the difference in temperature between the surfaces contacting the specimen is measured with temperature sensors embedded in the surfaces together with the electrical output of the HFT. This output (voltage) is proportional to the specimen and the reproducible thermal resistance of the specimen and the reproducible thermal resistance of the contacts at each surface. The proportionality is obtained through prior calibration of the system with specimens of known thermal resistance measured under the same conditions such that contact resistance at the surface is made reproducible. Typically, the thermal conductivity is reported in units of $Btu \cdot in/hr \cdot F \cdot ft^2$ or in units of $W/m \cdot {}^\circ K$; the conversion factor for these units is $1\ Btu \cdot in/hr \cdot F \cdot ft^2 \sim 0.144228\ W/m \cdot {}^\circ K$.

The improved foam glass product made, for example, from natural glasses, preferably has a thermal conductivity less than $0.70\ Btu \cdot in/hr \cdot F \cdot ft^2$ at $25^\circ\ C$. (usually in the range of from 0.60 to 0.70 $Btu \cdot in/hr \cdot F \cdot ft^2$), more preferably has a thermal conductivity less than $0.60\ Btu \cdot in/hr \cdot F \cdot ft^2$ at $25^\circ\ C$. (usually in the range of from 0.50 to 0.60 $Btu \cdot in/hr \cdot F \cdot ft^2$), still more preferably has a thermal conductivity less than $0.50\ Btu \cdot in/hr \cdot F \cdot ft^2$ at $25^\circ\ C$. (usually in the range of from 0.40 to 0.50 $Btu \cdot in/hr \cdot F \cdot ft^2$).

2. Compressive Strength

Compressive strength measures the stress at which a material fails under the load. Foam glasses with higher compressive strength is always preferred for almost all applications especially for construction applications.

The compressive strength of the improved foam glass products made, for example, from natural glasses, is measured based on a standard method of the American Society of Testing and Materials (ASTM C-165). In a preferred method, a 2.0 in. square specimen by 0.5 in. thick is placed between the 8.0 in. square loading surfaces of the testing machines. The specimen is compressed at a crosshead speed of 0.008 in./min continuously until a maximum load is reached. The maximum load is then recorded as the compressive strength. Typically, the compressive strength is reported in units of PSI or in units of kPa; the conversion factor for these units is 1 PSI~6.89476 kPa.

The improved foam glass product made, for example, from natural glasses, preferably has a compressive strength greater than 100 PSI (usually in the range of from 100 to 200 PSI), more preferably has a compressive strength greater than 200 PSI (usually in the range of from 100 to 200 PSI), still more preferably has a compressive strength greater than 300 PSI (usually in the range of 200 to 300 PSI), still more preferably has a compressive strength greater than 400 PSI (usually in the range of 300 to 400 PSI), still more preferably has a compressive strength greater than 500 PSI (usually in the range of 400 to 500 PSI), still more preferably has a compressive strength greater than 600 PSI (usually in the range of 600 to 640 PSI). Compared with the compressive strength of conventional foam glass products which are typically around 100 PSI, the improved foam glass product made, for example, from natural glasses has a significantly greater compressive strength.

3. Density

Density is an indicator of degree to which the foam glasses retain the porous structure with closed cells. Foam glasses with lower densities normally have greater void volume and thus better insulation efficiency.

The density of the samples in the present invention may be measured on the same samples used for thermal conductivity measurement. At least three measurements may be carried out on each dimension of the samples. The average of the measurements is used to calculate the volume of the samples. The density of the samples is then readily calculated by dividing the sample weight by the measured volume. Typically, the density is reported in units of $lb/ft^3$ or in units of $kg/m^3$; the conversion factor for these units is $1\ lb/ft^3 \sim 16.02\ kg/m^3$.

The improved foam glass product made, for example, from natural glasses, has a density for example less than 20 $lb/ft^3$ (e.g., in the range from 15 to 20 $lb/ft^3$); less than 15 $lb/ft^3$ (e.g., in the range from 10 to 15 $lb/ft^3$); less than 10 $lb/ft^3$ (e.g., in the range from 9 to 10 $lb/ft^3$). The improved foam glass product made, for example, from natural glasses may be prepared with still lower density.

4. Particle Size Distribution

To make consistent products, the particle size distribution of the glass feed material, such as perlite feed material, preferably needs to be controlled. Perlite feed material with finer particle size is more preferable for use in the batch materials to make the improved foam glass product.

The particle size distribution of the perlite feed material is determined in accordance with the phenomenon of scattered light from a laser beam projected through a stream of particles. The amount and direction of light scattered by the particles is measured by an optical detector array and then analyzed by a microcomputer which calculates the size distribution of the particles in the sample stream. Data reported may be collected on a Leeds and Northrup Microtrac X100 laser particle size analyzer (Leeds and Northrup, North Wales, Pa.). This instrument can determine particle size distribution over a particle size range from 0.12 to 704 microns. Bottom particle size ($d_{10}$) and top particle size ($d_{90}$) are defined as that size for which 10 percent or 90 percent of the volume that is smaller than the indicated size, respectively.

The particle size distribution of the materials such as perlite feed materials for present invention preferably has a bottom particle size ($d_{10}$) of 2 to 5 μm and a top particle size ($d_{90}$) of 11 to 50 μm.

C. Methods of Using the Improved Foam Glass Products Made from Natural Glasses

The improved foam glass products made, for example, from natural glasses, can be used in a manner analogous to the currently available thermal and acoustic insulating products, also in applications where its combined properties are superior to conventional foam glasses.

The low thermal conductivity, high compressive strength and low density characteristic of the improved foam glass products of the present invention are particularly effective for the thermal insulation and acoustic insulation applications in various industries.

Examples of applications for a thermal insulating material comprising an improved foam glass product made, for example, from natural glasses, include building insulation, insulation for sport grounds, insulation for swimming pools, roof insulation, insulation for pipelines, vessels, tanks, furnaces, cold storage facilities and other equipment requiring heat/cold insulation.

Examples of applications for an acoustic insulating material comprising an improved foam glass product made, for example, from natural glasses, include musical halls, movie theaters and other facilities and equipment requiring sound insulation.

Examples of applications for a lightweight rigid structural material comprising an improved foam glass product made, for example, from natural glasses, include road construction, pile foundation, trench filling and stabilizing material for slipping soil.

Examples of applications for a lightweight chemical resistant material comprising an improved foam glass product made, for example, from natural glasses, include a chimney liner, a duct liner for wet scrubbers, a liner for chemical reactors, a liner for stacks for municipal, hazardous and medical waste incinerators.

Examples of applications for a lightweight non-combustible material comprising an improved foam glass product made, for example, from natural glasses, include a fire resistant insulating material to protect the insulated facilities from fire damage and retard fire spread.

The aforementioned applications describe the utility of the improved foam glass product made, for example, from natural glasses, but many other applications may be envisioned for the improved foam glass products.

EXAMPLES

Improved foam glass products of present invention and methods for their preparation are described in the following examples, which are offered by way of illustration and not by way of limitation. Tests to determine the thermal conductivity, density, compressive strength were carried out according to the methods described above.

Examples 1 to 6 were prepared using a commercially available unexpanded fine perlite ore product Harborlite® MB grade as the feed material. This feed material had a particle size distribution (PSD) from 2 µm ($d_{10}$) to 11 µm ($d_{90}$).

Examples 7 to 12 were prepared using a commercially available expanded fine perlite product Harborlite® 200 grade as the feed material. This feed material had a particle size distribution (PSD) from 5 µm ($d_{10}$) to 50 µm ($d_{90}$).

Example 1

A commercially available unexpanded fine perlite ore product Harborlite® MB grade was used as the feed material. This feed material had a particle size distribution (PSD) from 2 µm ($d_{10}$) to 11 µm ($d_{90}$). 60 g of this feed material was mixed with 3.0 g of soda ash, 6.0 g of calcium carbonate and 0.2 g of carbon black. The mixture was then evenly separated to 6 batches and each batch was milled in a small steel mill for 30 minutes. The milled mixture was placed in a 3 in diameter nickel crucible coated with aluminum oxide as the releasing agent. The foam glass was formed by melting the mixture at 2057° F. (1125° C.) for 30 minutes in an electrical furnace and then annealed in a separate furnace. The annealing process was achieved by furnace cooling the sample from 1293° F. (700° C.) to room temperature. The foam glass thus obtained had a pore size distribution from 0.5 mm to 1.0 mm in diameter, a thermal conductivity of from 0.69 Btu·in/hr·F·ft² (0.100 W/m.° K) at 73° F. (296° K) to 1.25 Btu·in/hr·F·ft² (0.179 W/m.° K) at 570° F. (572° K), density of 17.7 lb/ft³ (283 kg/m³) and a compressive strength of 298 PSI (2055 kPa).

Example 2

Example 1 was repeated, except that 4.2 g of soda ash was used. The foam glass thus obtained had a pore size distribution from 1.0 mm to 3.0 mm in diameter, a thermal conductivity of from 0.64 Btu·in/hr·F·ft² (0.091 W/m.° K) at 73° F. (296° K) to 1.20 Btu·in/hr·F·ft² (0.172 W/m.° K) at 570° F. (572° K), density of 16.5 lb/ft³ (265 kg/m³) and a compressive strength of 246 PSI (1696 kPa).

Example 3

Example 1 was repeated, except that 0.40 g of carbon black was used. The foam glass thus obtained had a pore size distribution from 1.0 mm to 2.0 mm in diameter, a thermal conductivity of 0.55 Btu·in/hr·F·ft² (0.080 W/m.° K) at 75° F. (297 K) and 1.11 Btu·in/hr·F·ft² (0.160 W/m.° K) at 570° F. (572° K), density of 13.7 lb/ft³ (220 kg/m³) and a compressive strength of 229 PSI (1579 kPa).

Example 4

Example 2 was repeated, except that 0.40 g of carbon black was used. The foam glass thus obtained had a pore size distribution from 2.0 mm to 3.0 mm in diameter, a thermal conductivity of 0.51 Btu·in/hr·F·ft² (0.074 W/m.° K) at 75° F. (297° K) and 1.11 Btu·in/hr·F·ft² (0.161 W/m.° K) at 570° F. (572° K), density of 13.1 lb/ft³ (210 kg/m³) and a compressive strength of 223 PSI (1538 kPa).

Example 5

Example 3 was repeated, except that 3.0 g of boric acid was added. The foam glass thus obtained had a pore size distribution from 1.0 mm to 2.0 mm in diameter, a thermal conductivity of 0.58 Btu·in/hr·F·ft² (0.083 W/m.° K) at 72° F. (295° K) and 1.11 Btu·in/hr·F·ft² (0.160 W/m.° K) at 573° F. (574° K), density of 10.3 lb/ft³ (165 kg/m³) and a compressive strength of 640 PSI (4414 kPa).

Example 6

Example 2 was repeated, except that 3.0 g of boric acid was added. The foam glass thus obtained had a pore size distribution from 2.0 mm to 3.0 mm in diameter, a thermal conductivity of 0.48 Btu·in/hr·F·ft² (0.069 W/m.° K) at 73° F. (296° K) and 1.06 Btu·in/hr·F·ft² (0.153 W/m.° K) at 570° F. (572° K), density of 9.05 lb/ft³ (145 kg/m³) and a compressive strength of 419 PSI (2890 kPa).

Example 7

A commercially available expanded fine perlite product Harborlite® 200 grade was used as the feed material. This feed material had a particle size distribution (PSD) from 5 µm ($d_{10}$) to 50 µm ($d_{90}$). 60 g of this feed material was mixed with 1.8 g of soda ash, 6.0 g of calcium carbonate and 0.2 g of carbon black. The mixture was then separated to 6 batches with even weight and each batch was milled in a small steel mill for 30 minutes. The milled mixture was placed in a 3 in diameter nickel crucible coated with aluminum oxide as the releasing agent. The foam glass was formed by melting the mixture at 1125° C. for 30 minutes in an electrical furnace and then annealed in a separate furnace. The annealing process was achieved by furnace cooling the sample from 700° C. to room temperature. The foam glass thus obtained had a pore size distribution from 0.3 mm to 0.8 mm in diameter, a thermal conductivity of from 0.68 Btu·in/hr·F·ft$^2$ (0.097 W/m.° K) at 73° F. (296° K) to 1.19 Btu·in/hr·F·ft$^2$ (0.171 W/m.° K) at 570° F. (572° K), density of 15.2 lb/ft$^3$ (243 kg/m$^3$) and a compressive strength of 329 PSI (2268 kPa).

Example 8

Example 5 was repeated, except that 3.0 g of soda ash was used. The foam glass thus obtained had a pore size distribution from 0.5 mm to 1.0 mm in diameter, a thermal conductivity of from 0.61 Btu·in/hr·F·ft$^2$ (0.087 W/m.° K) at 73° F. (296° K) to 1.15 Btu·in/hr·F·ft$^2$ (0.165 W/m.° K) at 570° F. (572° K), density of 13.2 lb/ft$^3$ (212 kg/m$^3$) and a compressive strength of 188 PSI (1296 kPa).

Example 9

Example 7 was repeated, except that 0.40 g of carbon black was used. The foam glass thus obtained had a pore size distribution from 0.5 mm to 1.0 mm in diameter, a thermal conductivity of 0.60 Btu·in/hr·F·ft$^2$ (0.086 W/m.° K) at 75° F. (297° K) and 1.04 Btu·in/hr·F·ft$^2$ (0.150 W/m.° K) at 570° F. (572° K), density of 13.1 lb/ft$^3$ (210 kg/m$^3$) and a compressive strength of 342 PSI (2358 kPa).

Example 10

Example 8 was repeated, except that 0.40 g of carbon black was used. The foam glass thus obtained had a pore size distribution from 1.0 mm to 2.0 mm in diameter, a thermal conductivity of 0.65 Btu·in/hr·F·ft$^2$ (0.093 W/m.° K) at 73° F. (296° K) and 1.18 Btu·in/hr·F·ft$^2$ (0.170 W/m.° K) at 570° F. (572° K), density of 11.5 lb/ft$^3$ (185 kg/m$^3$) and a compressive strength of 144 PSI (993 kPa)

Example 11

Example 9 was repeated, except that 3.0 g of boric acid was added. The foam glass thus obtained had a pore size distribution from 1.0 mm to 2.0 mm in diameter, a thermal conductivity of 0.62 Btu·in/hr·F·ft$^2$ (0.089 W/m.° K) at 73° F. (297° K) and 1.17 Btu·in/hr·F·ft$^2$ (0.169 W/m.° K) at 570° F. (572° K), density of 10.8 lb/ft$^3$ (173 kg/m$^3$) and a compressive strength of 498 PSI (3435 kPa).

Example 12

Example 10 was repeated, except that 3.0 g of boric acid was added. The foam glass thus obtained had a pore size distribution from 1.0 mm to 2.0 mm in diameter, a thermal conductivity of 0.58 Btu·in/hr·F·ft$^2$ (0.084 W/m.° K) at 73° F. (296° K) and 1.14 Btu·in/hr·F·ft$^2$ (0.165 W/m.° K) at 570° F. (572° K), density of 11.0 lb/ft$^3$ (176 kg/m$^3$) and a compressive strength of 320 PSI (2207 kPa).

D. Publications

The disclosures of the publications, patents, and published patent applications referenced herein and below are hereby incorporated by reference into the present disclosure in their entirety.

American Society for Testing and Materials, ASTM Designation C162 (1990), *Standard Terminology of Glass and Glass Products*.

American Society for Testing and Materials, ASTM Designation E1530 (1993), *Test method for Evaluating the resistance to Thermal Transmission of Thin Specimens of Materials by the Guarded Heat Flow Meter Technique*.

American Society for Testing and Materials, ASTM Designation C165 (Reapproved 2000), *Standard Test Method for Measuring Compressive Properties of Thermal Insulations*.

Alhamd, S. G. M. Y. (1997), U.S. Pat. No. 6,054,088.

Berry, L. G. et al. (1983), *Mineralogy* (Second Edition) (New York: Freeman and Co.); pp. 540-542.

Elmer, T. H. and Middaugh, H. D. (1971), U.S. Pat. No. 3,592,619.

Fukumoto, K., Kawanishi, K., Nakada, R. and Yamano, J. (1991), U.S. Pat. No. 4,990,398.

Fukumoto, K., Kawanishi, K., Nakada, R. and Yamano, J. (1991), U.S. Pat. No. 5,069,960.

Hojaji, H., Macedo, P. D. and Litovitz, T. A. (1984), U.S. Pat. No. 4,430,108.

Kujawa, R. J. (1983), in *Industrial Minerals and Rocks*, 5th ed. (Littleton, Colo.: Society for Mining, Metallurgy, and Exploration, Inc.), pp. 199-201.

Neuschotz, R. (1947), U.S. Pat. No. 2,431,884.

Scholes, S. (1974), *Modern Glass Practice*, 7th ed. by C. Greene (Boston, Mass.: CBI Publishing Company, Inc.).

Solomon, D. and Rossetti, M. (1996), U.S. Pat. No. 5,516,351.

Shepherd, P. B. (1993), U.S. Pat. No. 5,256,222.

Sun, S. and Yu, Z. (2000), *Non-Metallic Mines* (in Chinese), Vol. 23(1), pp. 29.

Zoradi, E. D. (1952), U.S. Pat. No. 2,602,782.

What is claimed is:

1. An improved foam glass product derived from at least one of expanded perlite and unexpanded perlite and at least 5% by weight calcium carbonate, wherein the product has a thermal conductivity less than 0.70 Btu·in/hr·F·ft$^2$ (0.101 W/m·° K) at 73° F. (296° K), a compressive strength greater than 400 PSI (2758 kPa) and a density less than 20 lb/ft$^3$ (320 kg/m$^3$).

2. The improved foam glass product of claim 1, wherein the product has a thermal conductivity less than 0.60 Btu·in/hr·F·ft$^2$ (0.087 W/m·° K) at 73° F. (296° K).

3. The improved foam glass product of claim 2, wherein the product has a thermal conductivity less than 0.50 Btu·in/hr·F·ft$^2$ (0.072 W/m·° K) at 73° F. (296° K).

4. The improved foam glass product of claim 1, wherein the product has a compressive strength greater than 500 PSI (3447 kPa).

5. The improved foam glass product of claim 4, wherein the product has a compressive strength greater than 600 PSI (4137 kPa).

6. The improved foam glass product of claim 1, wherein the product has a density less than 15 lb/ft$^3$ (240 kg/m$^3$).

7. The improved foam glass product of claim 6, wherein the product has a density less than 10 lb/ft$^3$ (160 kg/m$^3$).

8. A thermal insulating material comprising a foam glass product according to claim 1.

9. The thermal insulating material of claim 8, further comprising a structural or reinforcing material.

10. An acoustic insulating material comprising a foam glass product according to claim 1.

11. The acoustic insulating material of claim 10, further comprising a structural or reinforcing material.

12. A lightweight rigid structural material comprising a foam glass product according to claim 1.

13. The lightweight rigid structural material of claim 12, further comprising a structural or reinforcing material.

14. A lightweight chemical resistant material comprising a foam glass product according to claim 1.

15. The lightweight chemical resistant material of claim 14, further comprising a structural or reinforcing material.

16. A lightweight non-combustible material comprising a foam glass product according to claim 1.

17. The lightweight non-combustible material of claim 16, further comprising a structural or reinforcing material.

18. A composition comprising an improved foam glass product according to claim 1 and a structural or reinforcing material.

19. The composition of claim 18, wherein the structural or reinforcing material comprises at least one of carbon fiber, glass fiber, metal fiber, ceramic fiber, woven fiber, metal honeycomb, ceramic honeycomb, fibrous minerals, and wollastonite.

20. A composition comprising the a foam glass product according to claim 1, wherein the foam glass product comprises a glaze or coating.

21. The composition of claim 20, further comprising a structural or reinforcing material.

22. The foam glass product of claim 1, wherein said at least one of expanded perlite and unexpanded perlite has a top particle size $d_{90}$ ranging from 11 μm to 50 μm.

23. The foam glass product of claim 1, wherein said at least one of expanded perlite and unexpanded perlite has a bottom particle size $d_{10}$ ranging from 2 μm to 5 μm.

24. The foam glass product of claim 1, derived from calcium carbonate that is present in an amount ranging from 5% to 10% by weight.

* * * * *

UNITED STATES PATENT AND TRADEMARK OFFICE
CERTIFICATE OF CORRECTION

| | |
|---|---|
| PATENT NO. | : 7,459,208 B2 |
| APPLICATION NO. | : 10/487305 |
| DATED | : December 2, 2008 |
| INVENTOR(S) | : Bo Wang |

It is certified that error appears in the above-identified patent and that said Letters Patent is hereby corrected as shown below:

Column 14, line 4, claim 20: delete "the".

Signed and Sealed this

Twenty-fourth Day of February, 2009

JOHN DOLL
*Acting Director of the United States Patent and Trademark Office*